(No Model.)
J. Q. BLACK.
SEAT FOR VEHICLES.
No. 587,175.  Patented July 27, 1897.
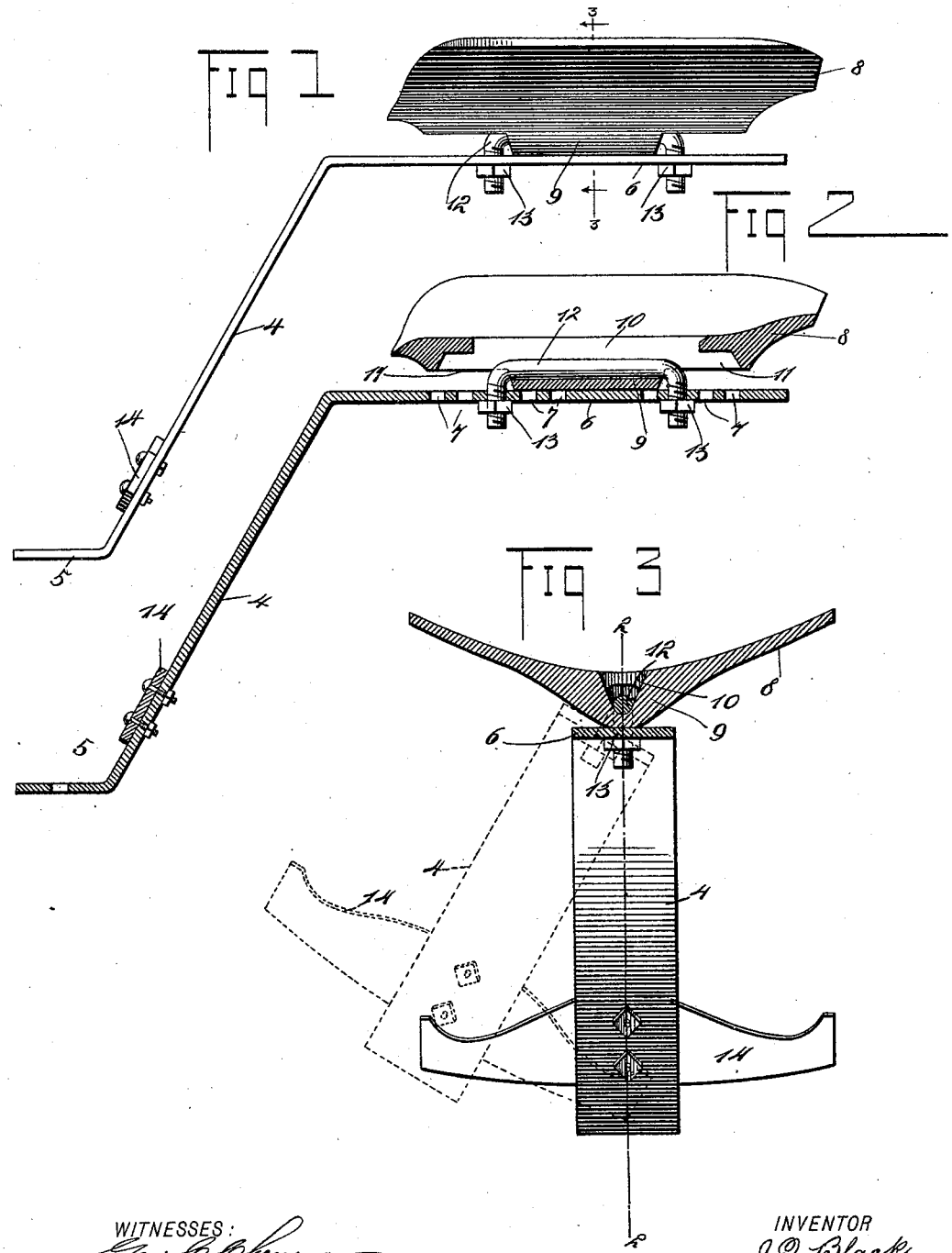
WITNESSES:
INVENTOR
J. Q. Black.
BY
ATTORNEYS.
THE NORRIS PETERS CO., PHOTO-LITHO., WASHINGTON, D. C.

UNITED STATES PATENT OFFICE.

JOHN Q. BLACK, OF LONE ROCK, WISCONSIN.

SEAT FOR VEHICLES.

SPECIFICATION forming part of Letters Patent No. 587,175, dated July 27, 1897.

Application filed February 27, 1897. Serial No. 625,250. (No model.)

*To all whom it may concern:*

Be it known that I, JOHN Q. BLACK, of Lone Rock, in the county of Richland and State of Wisconsin, have invented a new and Improved Seat for Vehicles, of which the following is a full, clear, and exact description.

The object of this invention is to provide a superior seat for vehicles, particularly agricultural machinery, and of that class in which means are provided to prevent the careening of the machine from throwing the operator from his seat. In attaining this end I employ a standard-plate, to the lower end of which is fixed a transverse foot-bar and on the upper end of which is carried a peculiarly-constructed seat.

The invention will be fully described hereinafter and defined in the claims.

Reference is to be had to the accompanying drawings, forming a part of this specification, in which similar characters of reference indicate corresponding parts in all the figures.

Figure 1 is a side elevation of the invention. Fig. 2 is a sectional view on the line 2 2 of Fig. 3, and Fig. 3 is a sectional view on the line 3 3 of Fig. 1.

The standard-plate 4 has its lower end bent to form a base portion 5, adapted to be bolted to the vehicle. The upper end of the standard-plate 4 is bent horizontally and rearwardly to form a table 6, provided with a series of openings 7.

The seat proper, 8, consists in a plate the upper surface of which has any suitable form and the lower surface of which is provided with a longitudinally-extending centrally-located rib 9. The rib 9 is formed with a passage 10, running longitudinally through it. The lower portion of each end of the rib is cut away at the points indicated by the numerals 11, so that a short U-shaped bolt 12, such as is shown in the drawings, may be passed through the slot 10 and engaged with two of the openings 7 in the table 6. By this construction it is possible to use a larger bolt, which will in this case engage with those openings 7 that are outward from the openings 7 with which the bolt 12 is shown as engaged. The slot 10 opens upward through the top surface of the seat, so that small bolts may be moved downward into the slot 10 and engaged with the rib 9 at the bottom of said slot. If it is desired to use a bolt so large that it may have its ends respectively engaged with the two outermost openings 7, this bolt may be bowed slightly and passed into the slot 10, through one end thereof, at the under side of the seat 8, after which the terminals of the bolt may be bent down perpendicular to the main portion of the bolt, so as to enter the corresponding openings 7. The bolt 12 is fastened in place by nuts 13, respectively working on the threaded ends of the bolt. When a bolt is used of such a size that it fills the slot 10 and extends into the recesses 11, the seat with the bolt may be adjusted forward and back on the table 6 to properly distribute the weight of the driver over the machine. This may be attained by changing the bolt in the openings of the table 6.

Rigidly secured to the lower portion of the standard-plate 4, at a point just about the base portion 5 thereof, is a transverse foot-plate 14. The plate 14 extends beyond each side of the plate 4 and is adapted to have the feet of the rider rested thereon.

In using the invention the bolt 12 is held on the table 6 in such a way that the seat 8 may rock freely on the table, the lower surface of the rib 9 forming a rolling contact with the table, which enables the seat to rock freely. A person rested on the seat should place his feet on the foot-bar 14, whereupon, as the machine or vehicle swings in the manner indicated by dotted lines in Fig. 3, the rider may balance himself upon the seat 8 by rocking the same as he bears upon the foot-plate 14. This construction makes it very much easier for the rider, and prevents the rider from being thrown from his seat or from being fatigued by the cramped and uncomfortable position in which he would be otherwise placed upon the tilting of the machine to which the seat is attached.

Having thus described my invention, I claim as new and desire to secure by Letters Patent—

1. A vehicle-seat comprising a standard-plate, the upper end of which is bent to form a table having two openings therein, a seat proper, the lower side of which is provided with a longitudinally-extending rib having a rounded lower surface forming a rocker, the rib having a slot running through it, and a U-shaped bolt seated in the slot and having its ends secured in the table, substantially as described.

2. A vehicle-seat having a standard-plate, the upper end of which is bent to form a table, a seat provided with a rib running longitudinally along its lower surface, the rib having a convex surface, forming a rocker adapted to rest on the table, and means engaged with the seat proper, whereby the seat proper is held within the lower surface of the rib bearing on the table so as to rock from side to side, substantially as described.

3. A vehicle-seat having a rib running longitudinally along the under surface thereof, the rib having a convex surface forming a rocker whereon the seat may roll from side to side, and the rib having a slot running longitudinally through it, and opening at each end of the rib, said slot being capable of containing means for holding the seat in place, substantially as described.

4. A seat having a standard-plate, the upper end of which is bent horizontally to form a table, a U-shaped bolt having its ends connected with the table, and a seat proper having a rib running longitudinally along the under side thereof, the rib having a slot receiving a point of the U-shaped bolt, and the rib having a convex under surface forming a rocker and bearing on the upper side of the plate, whereby the seat may roll freely from side to side, substantially as described.

JOHN Q. BLACK.

Witnesses:
JOHN F. BEARDSLY,
CHARLES M. FOSTER.